(12) United States Patent
Sun et al.

(10) Patent No.: US 12,126,530 B2
(45) Date of Patent: Oct. 22, 2024

(54) DATA TRANSMISSION METHOD AND APPARATUS, COMPUTER READABLE MEDIUM, AND ELECTRONIC DEVICE

(71) Applicant: Tencent Technology (Shenzhen) Company Limited, Shenzhen (CN)

(72) Inventors: Feihu Sun, Shenzhen (CN); Dan Zhang, Shenzhen (CN); Jingjing Hao, Shenzhen (CN); Binhui Ning, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 863 days.

(21) Appl. No.: 17/229,699

(22) Filed: Apr. 13, 2021

(65) Prior Publication Data

US 2021/0234798 A1 Jul. 29, 2021

Related U.S. Application Data

(63) Continuation of application No. PCT/CN2019/125125, filed on Dec. 13, 2019.

(30) Foreign Application Priority Data

Jan. 3, 2019 (CN) .................. 201910004540.X

(51) Int. Cl.
*H04L 45/74* (2022.01)
*H04L 69/16* (2022.01)
(Continued)

(52) U.S. Cl.
CPC .............. *H04L 45/74* (2013.01); *H04L 69/16* (2013.01); *H04W 28/0289* (2013.01); *H04W 76/15* (2018.02)

(58) Field of Classification Search
None
See application file for complete search history.

(56) References Cited

U.S. PATENT DOCUMENTS

2011/0314129 A1* 12/2011 Rezaiifar ............... H04L 67/02
709/218
2012/0271956 A1* 10/2012 Sugimoto ........... H04L 12/6418
709/227
(Continued)

FOREIGN PATENT DOCUMENTS

CN          102656862 A     9/2012
CN          103441996 A    12/2013
(Continued)

OTHER PUBLICATIONS

"3rd Generation Partnership Project; Technical Specification Group Services and System Aspects; Study on Access Traffic Steering, Switching and Splitting Support in the 5G System Architecture (Release 16)", 3GPP Standard, Technical Report; 3GPP TR 23.793, $3^{rd}$ Generation Partnership Project (3GPP), Mobile Competence Centre, vol. SA WG2, No. V0.6.0, Aug. 13, 2018, XP051475132, 80 pgs.

(Continued)

*Primary Examiner* — Srinivasa R Reddivalam
(74) *Attorney, Agent, or Firm* — Morgan, Lewis & Bockius LLP

(57) ABSTRACT

Disclosed are a data transmission method and apparatus, a non-transitory computer readable storage medium, and a computing device. The data transmission method is executed by a computing device, and includes: receiving first packets transmitted by a first device over multiple data channels; parsing the first packets to obtain address information of the first device, and performing aggregation on the first packets according to headers of the first packets, to obtain second packets, the designated address information (Continued)

comprising a virtual port assigned to the first device and associated with the address information of the first device; replacing source address information of the second packets with designated address information, to obtain third packets; and transmitting the third packets to a second device, the second device being a device that the first device needs to access.

20 Claims, 8 Drawing Sheets

(51) Int. Cl.
*H04W 28/02* (2009.01)
*H04W 76/15* (2018.01)

(56) References Cited

U.S. PATENT DOCUMENTS

| | | | |
|---|---|---|---|
| 2013/0237226 | A1 | 9/2013 | Periyalwar et al. |
| 2013/0286814 | A1* | 10/2013 | Lee .................. H04L 45/243 370/216 |
| 2016/0261756 | A1* | 9/2016 | Altman .................. H04L 63/08 |
| 2017/0134261 | A1 | 5/2017 | Seo et al. |
| 2018/0027097 | A1 | 1/2018 | Boucadair et al. |
| 2019/0261263 | A1* | 8/2019 | Tu .................. H04L 47/193 |

FOREIGN PATENT DOCUMENTS

| | | |
|---|---|---|
| CN | 103493399 A | 1/2014 |
| CN | 105187312 A | 12/2015 |
| CN | 107623646 A | 1/2018 |
| CN | 108809549 A | 11/2018 |
| CN | 109600388 A | 4/2019 |
| JP | 2010114692 A | 5/2010 |
| JP | 2011061253 A | 3/2011 |
| JP | 2013515400 A | 5/2013 |
| JP | 2014135719 A | 7/2014 |
| WO | WO 2011075739 A1 | 6/2011 |

OTHER PUBLICATIONS

Extended European Search Report, EP19908065.6, Jan. 24, 2022, 7 pgs.
Tencent Technology, Isr, PCT/CN2019/125125, Mar. 13, 2020, 2 pgs.
Tencent Technology, WO, PCT/CN2019/125125, Mar. 13, 2020, 4 pgs.
Tencent Technology, IPRP, PCT/CN2019/125125, Jun. 16, 2021, 5 pgs.
Sadanori Aoyagi et al., "Shepherd: A User-led Virtual Private SubNetwork Construction Architecture", IEICE Technical Report, vol. 106, No. 577, Mar. 1, 2007, 7 pgs.

* cited by examiner

DATA TRANSMISSION METHOD AND APPARATUS, COMPUTER READABLE MEDIUM, AND ELECTRONIC DEVICE

CROSS-REFERENCE TO RELATED APPLICATIONS

This application is a continuation application of PCT Patent Application No. PCT/CN2019/125125, entitled "DATA TRANSMISSION METHOD AND APPARATUS, COMPUTER READABLE MEDIUM AND ELECTRONIC DEVICE" filed on Dec. 13, 2019, which claims priority to Chinese Patent Application No. 201910004540.X, entitled "DATA TRANSMISSION METHOD AND APPARATUS, COMPUTER READABLE MEDIUM AND ELECTRONIC DEVICE" filed on Jan. 3, 2019, all of which are incorporated by reference in their entirety.

FIELD OF THE TECHNOLOGY

This application relates to the field of computer and communication technology, and specifically to a data transmission method and apparatus, a computer readable medium, and an electronic device.

BACKGROUND OF THE DISCLOSURE

As technologies advance, communications between applications are becoming more frequent. For example, game clients need to communicate with servers frequently. Such applications have high requirements on the network environment because they require low latency and high stability.

In wireless communication, network jitter caused by interferences and air interface congestion inevitably occurs due to the complexity of wireless environments and the characteristics of wireless communication protocols. Wireless Fidelity (Wi-Fi) is more susceptible to interferences because of its wider frequency spectrum; but it has lower latency since a Wi-Fi network has a smaller number of topology layers. Mobile communication networks (such as 3G/4G/5G) are not susceptible to interferences due to their narrower frequency spectrums. But in mobile communication networks, data transmission involves transmitting data through the operator's access layer, which results in higher latency; besides, deployment and capacity of the operator's base station equipment also cause high latency and congestion.

SUMMARY

According to embodiments, this application provides a data transmission method, executed by a computing device, including the following steps: receiving first packets transmitted by a first device over multiple data channels; parsing the first packets to obtain address information of the first device, and performing aggregation on the first packets according to headers of the first packets, to obtain second packets; replacing source address information of the second packets with designated address information, to obtain third packets, wherein the designated address information comprises a virtual port assigned to the first device and associated with the address information of the first device; and transmitting the third packets to a second device, the second device being a device that the first device needs to access.

According to embodiments, this application provides a data transmission apparatus, including: a receiving unit, configured to receive first packets transmitted by a first device over multiple data channels; a first processing unit, configured to parse the first packets to obtain address information of the first device, and perform aggregation on the first packets according to headers of the first packets, to obtain second packets; a second processing unit, configured to replace source address information of the second packets with designated address information, to obtain third packets, wherein the designated address information comprises a virtual port assigned to the first device and associated with the address information of the first device; and a transmitting unit, configured to transmit the third packets to a second device, the second device being a device that the first device needs to access.

According to embodiments, this application also provides a non-transitory computer-readable storage medium, storing a plurality of computer programs, the computer programs, when executed by a processor of a computing device, cause the computing device to perform the data transmission method according to the above embodiments.

According to embodiments, this application also provides a computing device, including: one or more processors; and memory coupled to the one or more processors, configured to store one or more programs that, when executed by the one or more processors, cause the computing device to perform the data transmission method according to the above embodiments.

BRIEF DESCRIPTION OF THE DRAWINGS

Accompanying drawings herein are incorporated into the specification and constitute a part of this specification, show embodiments that conform to this application, and are used for describing a principle of this application together with this specification. Apparently, the accompanying drawings described below are merely some embodiments of this application, and a person of ordinary skill in the art may further obtain other accompanying drawings according to the accompanying drawings without creative efforts. In the accompanying drawings.

DESCRIPTION OF EMBODIMENTS

Exemplary implementations will now be described more thoroughly with reference to the accompanying drawings. However, the exemplary implementations may be implemented in various forms, and are not to be understood as being limited to the examples described herein. Instead, the implementations are provided to make this application more thorough and complete and fully convey the idea of the exemplary implementations to a person skilled in the art.

In addition, the described characteristics, structures, or features may be combined in one or more embodiments in any appropriate manner. In the following descriptions, a lot of specific details are provided to give a comprehensive understanding of the embodiments of this application. However, a person of ordinary skill in the art is to be aware that, the technical solutions in this application may be implemented without one or more of the particular details, or another method, unit, apparatus, or step may be used. In other cases, well-known methods, apparatuses, implementations, or operations are not shown or described in detail, in order not to obscure the aspects of this application.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions, do not need to include all content and operations/steps, and do not need to be performed in the described orders either. For example, some operations/steps may be further divided, while some operations/steps may be combined or partially combined. Therefore, the actual execution order may be changed according to actual cases.

Figure 1:
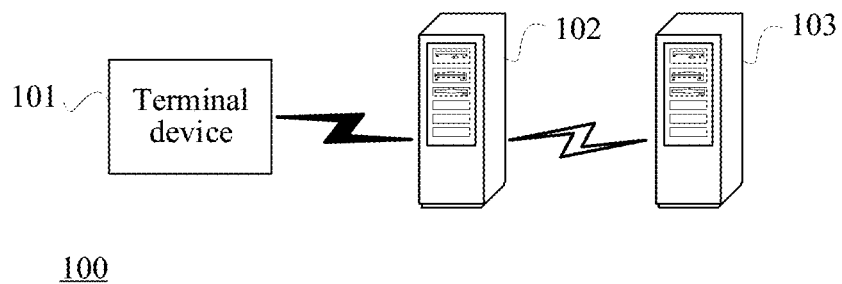
FIG. 1 is a schematic diagram of an exemplary system architecture to which a technical solution according to an embodiment of this application may be applied.

FIG. 1 is a schematic diagram of an exemplary system architecture to which a technical solution according to an embodiment of this application may be applied.

As shown in FIG. 1, the system architecture includes a terminal device 101, a multi-channel proxy server 102, and an application server 103. The multi-channel proxy server 102 is configured to aggregate data transmitted by the terminal device 101 over multiple data channels, and transmit the aggregated data to the application server 103; and return data transmitted by the application server 103 to the terminal device 101 over multiple data channels.

The terminal device 101 may be one or more of a smartphone, a tablet computer, and a portable computer, or may be a desktop computer or the like.

The numbers of the terminal device 101, the multi-channel proxy server 102, and the application server 103 in FIG. 1 are merely exemplary. Any numbers of terminal devices 101, multi-channel proxy servers 102 and application servers 103 may be used according to needs. The application server 103 may be a game server. The game server may be a single server or a server cluster having multiple servers.

In an embodiment of this application, in a case where the terminal device 101 is a smartphone (or a tablet computer, or a portable computer, etc.), after the multi-channel proxy server 102 receives connection data transmitted by the smartphone, the multi-channel proxy server 102 may assign a virtual port to the smartphone, store the virtual port in association with real address information of the smartphone, and at the same time record a virtual IP address (VIP) of the application server to be accessed by the smartphone. After receiving application service packets transmitted by the smartphone over the multiple data channels, the multi-channel proxy server 102 performs aggregation (such as deduplication) on the application service packets, and replaces source address information of the application service packets after the deduplication processing with address information of the multi-channel proxy server 102 (including the aforementioned virtual port), and then transmits the application service packets to the application server 103. The aforementioned multiple data channels may include wireless local area network (LAN) channels, for example, a Wi-Fi channel, and mobile communication channels such as a fourth-generation (4G) channel.

After receiving packets transmitted by the application server 103, the multi-channel proxy server 102 obtains packets that need to be transmitted to the smartphone according to source address information of the packets and the previously recorded VIP, and modifies destination address information of the obtained packets to the real address information of the smartphone according to the recorded virtual port and the real address information of the smartphone, and then transmits the packets to the smartphone over multiple data channels.

As can be seen, the technical solution according to the embodiment of this application transmits packets over multiple data channels to ensure packet transmission stability. This effectively solves the problems of high packet loss rate and high latency during data transmission, also achieves full-stack multi-channel data transmission, thereby satisfying service requirements in a variety of communication scenarios.

The following describes the details of technical solutions according to embodiments of this application based on the system architecture shown in FIG. 1.

Figure 2:
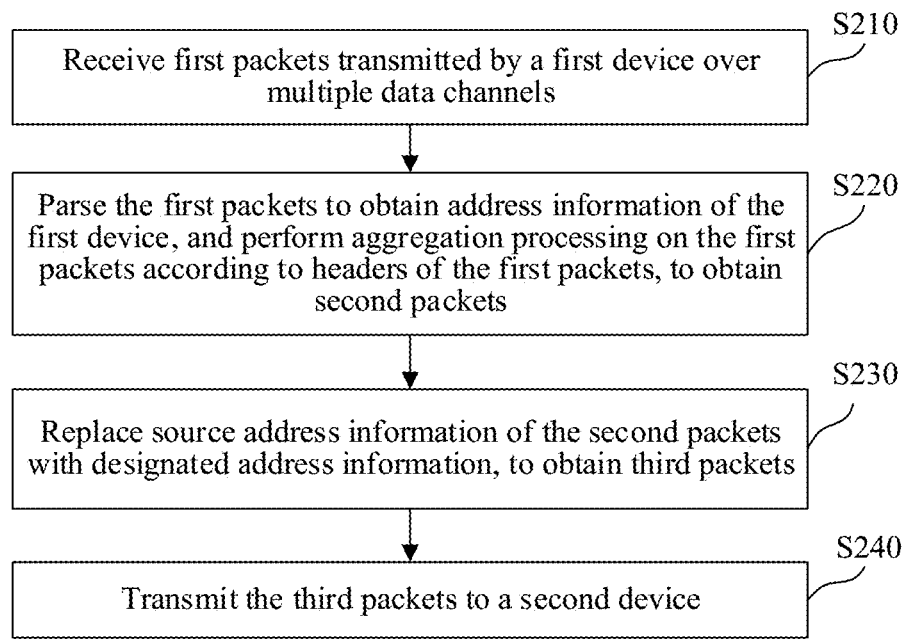
FIG. 2 is a schematic flowchart of a data transmission method according to an embodiment of this application.

FIG. 2 is a schematic flowchart of a data transmission method according to an embodiment of this application. The data transmission method may be executed by a server. The server may be a proxy server, for example, the multi-channel proxy server 102 shown in FIG. 1. Referring to FIG. 2, the data transmission method includes at least steps S210 to S240, which are described in detail as follows.

Step S210. Receive first packets transmitted by a first device over multiple data channels.

In an embodiment of this application, the multiple data channels may include two or more of the following data channels: a Wi-Fi channel, a Bluetooth channel, a wired channel, mobile communication network (such as 3G/4G/5G, etc.) channels, etc.

In an embodiment of this application, the first device transmits exactly the same packets via multiple data channels. Additionally or alternatively, one of the multiple data channels transmits all of the packets, and the others transmit part of the packets (e.g., only two in every five packets). Additionally or alternatively, the multiple data channels respectively transmit part of the packets, so that the receiver can obtain all of the packets by performing packet aggregation.

In an embodiment of this application, the first packets transmitted by the first device may be Transmission Control Protocol (TCP) packets, or User Datagram Protocol (UDP) packets, or Internet Protocol (IP) packets.

In an embodiment of this application, during the process of the multi-channel proxy server establishing a TCP connection with the first device, if a first TCP packet received from the first device is not a packet for establishing the TCP connection (e.g., a SYN packet), then a packet for resetting the connection (e.g., a RST packet) is transmitted to the first device, to ensure that the first device can reestablish the connection with the multi-channel proxy server as soon as possible.

In an embodiment of this application, after receiving a packet for terminating the TCP connection (e.g., a FIN packet) transmitted by the first device, the multi-channel proxy server may delete stored information related to the first device (such as address information of the first device, information about the virtual port assigned to the first device, and address information that the first device needs to access, etc.) after a predetermined period of time has elapsed.

Step S220. Parse the first packets to obtain address information of the first device, and perform aggregating processing on the first packets according to headers of the first packets to obtain second packets.

In an embodiment of this application, the address information of the first device may include an intranet Internet Protocol (IP) address and intranet port information of the first device.

In an embodiment of this application, the aggregating processing on the first packets according to the headers of the first packets may be implemented by performing deduplication processing and/or integration processing on the packets transmitted by the first device over the multiple data channels, to obtain all unique packets. For example, the deduplication processing (e.g., eliminating packets with duplicated packet sequence numbers) and/or the integration processing (e.g., integrating packets with different packet sequence numbers) may be implemented according to the packet sequence numbers in the headers of the first packets.

Step S230. Replace source address information of the second packets with designated address information, to obtain third packets.

In an embodiment of this application, the designated address information may include an IP address of the multi-channel proxy server and information about the virtual port assigned to the first device by the multi-channel proxy server. After the multi-channel proxy server assigns the virtual port to the first device, the multi-channel proxy server may store the information about the virtual port in association with the real address information of the first device. As such, in response to receiving packets transmitted by other devices, the multi-channel proxy server can determine whether the packets are addressed to the first device according to the information about the virtual port included in the received packets.

Step S240. Transmit the third packets to the second device.

In an embodiment of this application, the second device may be a device that the first device needs to access, for example, an application server.

In an embodiment of this application, the first packets transmitted by the first device may be parsed to obtain the address information that the first device needs to access. Accordingly, the second device can be determined according to the address information that the first device needs to access. In a case where the second device is an application server, the address information that the first device needs to access may be a VIP of the application server, where one VIP of the application server corresponds to one first device.

In an embodiment of this application, the multi-channel proxy server is further configured to set a maximum segment size of a packet transmitted by the second device. For example, the maximum segment size of the TCP protocol may be set by setting a TCP maximum segment size (mss) field.

In the technical solution according to the embodiment shown in FIG. 2, packets can be transmitted over multiple data channels to ensure the packet transmission stability, which effectively solves the problems of high packet loss rate and high latency during the data transmission. Besides, the aggregate processing allows the second device to receive non-duplicate packets, realizing a multi-data channel transmission without perception by the second device. In addition, since the source address information of the second packets is replaced with the designated address information (such as the address information of the proxy server), and then the packets are transmitted to the second device, the multi-channel transmission can be implemented no matter which communication way is used between the first device and the multi-channel proxy server. This realizes the full-stack multi-channel data transmission, thereby satisfying service requirements in a variety of communication scenarios.

Figure 3:
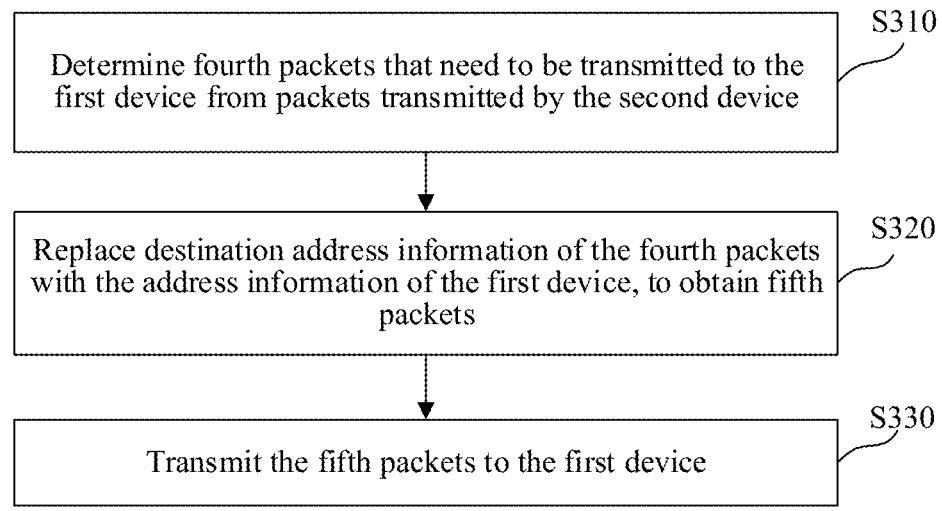
FIG. 3 is a schematic flowchart of a data transmission method according to an embodiment of this application.

Based on the technical solution of the embodiment shown in FIG. 2, FIG. 3 is a schematic flowchart of a data transmission method according to an embodiment of this application. The data transmission method may be executed by a server, where the server may be the multi-channel proxy server 102 shown in FIG. 1. Referring to FIG. 3, the data transmission method includes at least steps S310 to S330, which are described in detail as follows.

Step S310. Determine fourth packets that need to be transmitted to the first device from packets transmitted by the second device.

In an embodiment of this application, the fourth packets may be IP packets. That is, the second device may directly transmit IP packets to the multi-channel proxy server, thereby seamlessly supporting full-stack network multi-channel transmission.

In an embodiment of this application, after the multi-channel proxy server receives the first packets transmitted by the first device, the multi-channel proxy server may parse the first packets to obtain the address information that the first device needs to access, and stores the address information. In response to receiving the packets transmitted by the second device, the multi-channel proxy server may determine the fourth packets that need to be transmitted to the first device based on the stored address information that the first device needs to access.

Figure 4:
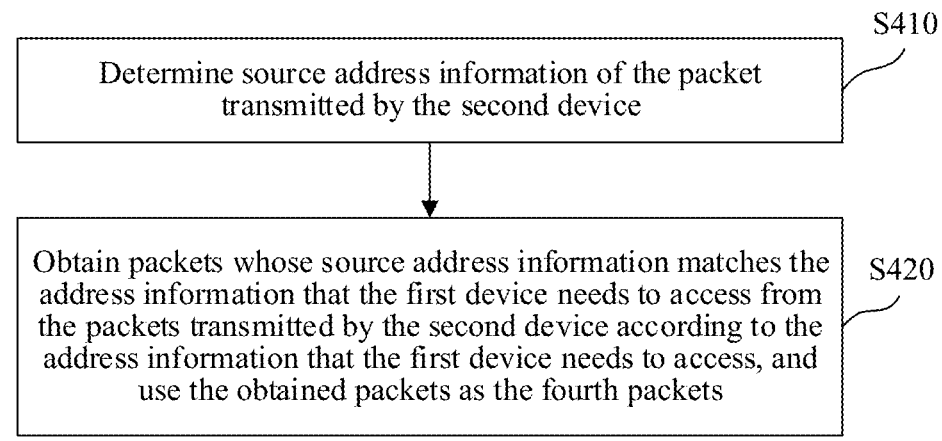
FIG. 4 is a schematic flowchart of determining fourth packets that need to be transmitted to the first device from packets transmitted by the second device according to an embodiment of this application.

FIG. 4 is a schematic flowchart of determining fourth packets that need to be transmitted to the first device from packets transmitted by the second device according to an embodiment of this application. As shown in FIG. 4, the specific steps are as follows.

Step S410. Determine source address information of the packets transmitted by the second device.

In an embodiment of this application, the source address information of the packets may be obtained by parsing the packets transmitted by the second device. In a case where the second device is an application server, the source address information of the packets transmitted by the second device may be virtual address information of the application server.

Step S420. Obtain packets whose source address information matches the address information that the first device needs to access from the packets transmitted by the second device according to the address information that the first device needs to access, and use the obtained packets as the fourth packets.

In an embodiment of this application, not all packets transmitted by the second device are destined to the first device. The source address information of the packets that are destined to the first device is the same as the destination address information of the packets transmitted by the first device. Thus, the packets whose source address information matches the address information that the first device needs to access can be obtained from the packets transmitted by the second device, and the obtained packets are used as the fourth packets that need to be transmitted to the first device.

Back to FIG. 3, in step S320, replace destination address information of the fourth packets with the address information of the first device, to obtain fifth packets.

In an embodiment of this application, the multi-channel proxy server may assign a virtual port to the first device in advance, and store the virtual port assigned to the first device in association with the address information of the first device. The destination address information of the fourth packets includes the IP address of the multi-channel proxy server and information about the virtual port assigned by the multi-channel proxy server to the first device. Thus, according to the information about the virtual port, the address information of the first device can be obtained through query from the stored association relationship between the virtual port and the address information. Then, the destination address information of the fourth packets is replaced with the address information of the first device. The address information of the first device may include the intranet address and the intranet port of the first device.

Step S330. Transmit the fifth packets to the first device.

In an embodiment of this application, the fifth packets may be transmitted to the first device over multiple data channels to ensure the packet transmission stability, thereby solving the problems of high packet loss rate and high latency during the data transmission. The first device may perform the aggregation after receiving the packets transmitted over the multiple data channels. The aggregation may include the deduplication processing and/or integration processing on the packets received by the first device over the multiple data channels, so as to obtain all unique packets.

In an embodiment of this application, the first device is further configured to transmit data channel information for the first packets to the multi-channel proxy server. The specific transmission manners may include, for example, real-time transmission, periodic transmission, and transmission when changes occur, etc. The multi-channel proxy server may store the data channel information after receiving the data channel information. As such, when the multi-channel proxy server transmits the fifth packets to the first device, the multi-channel proxy server may transmit the fifth packets to the first device according to latest stored data channel information, thereby enabling that the multi-channel proxy server can know and use the latest data channel information to transmit the packets to the first device.

In an embodiment of this application, the multi-channel proxy server is further configured to determine, based on a reception status of the first packets transmitted by the first device or reception statuses of other packets, network states of the data channels used by the first device when transmitting the packets, such as delay and congestion. By this way, when the multi-channel proxy server transmits the fifth packets to the first device, the multi-channel proxy server may select one or more data channels to transmit the fifth packets to the first device according to the network states of the data channels used by the first device when transmitting the packets. For example, in a case where the network state of a certain data channel is good, the fifth packets may be transmitted only over the data channel with a good network state, thereby reducing the occupation of the data channels and the traffic consumption. In a case where the network states of multiple data channels are poor, the fifth packets may be transmitted over the multiple data channels, so as to ensure the packet transmission stability, thereby avoiding the problems of high packet loss rate and high latency during the data transmission.

In an embodiment of this application, determining a network state of a data channel used by the first device when transmitting packets may be performed by calculating a delay of the packets transmitted by the first device based on a first moment at which the packets transmitted by the first device are received and a second moment included in the packets transmitted by the first device, and determining the network state of the data channel used by the first device when transmitting the packets according to the delay of the packets transmitted by the first device. If the delay of the packets transmitted by the first device is greater, the network state of the data channel used by the first device when transmitting the packets is poorer. If the delay of the packets transmitted by the first device is smaller, the network state of the data channel used by the first device when transmitting the packets is better.

In an embodiment of this application, the above-mentioned second moment is determined according to the moment at which the first device transmits the packet and a clock synchronization compensation value between the proxy server and the first device. Specifically, the first device may request a timestamp of the multi-channel proxy server from the multi-channel proxy server at regular intervals, and record a return delay of the multi-channel proxy server each time. An average delay avgDelay between the first device and the multi-channel proxy server can be obtained by averaging the return delays. According to the recorded timestamp svrTime of the multi-channel proxy server returned by the last request to the server and the current time of the first device localStartTime, the first device calculates the current time of the multi-channel proxy server svrStartTime=svrTime+avgDelay/2, and the svrStartTime−localStartTime can be used as the clock synchronization compensation value between the multi-channel proxy server and the first device. Assuming that the moment at which the first device transmits the packet is curTime, the above-mentioned second moment is CStime=curTime+svrStartTime−localStartTime.

In an embodiment of this application, the multi-channel proxy server is further configured to receive a reception status of the fifth packets transmitted to the first device that is returned by the first device, to determine network states of the data channels used by the first device when receiving the packets, such as delay and congestion. By this way, when the multi-channel proxy server transmits the fifth packets to the first device, the multi-channel proxy server may select one or more data channels to transmit the fifth packets to the first device according to the network states of the data channels used by the first device when receiving the packets. For example, in a case where the network state of a certain data channel is good, the fifth packets may be transmitted only over the data channel with a good network state, thereby reducing the occupation of the data channels and the traffic consumption. In a case where the network states of multiple data channels are poor, the fifth packets may be transmitted over the multiple data channels, so as to ensure the packet transmission stability, thereby avoiding the problems of high packet loss rate and high latency during the data transmission.

In an embodiment of this application, the multi-channel proxy server is further configured to determine, based on a reception status of the first packets transmitted by the first device or reception statuses of other packets, network states of the data channels used by the first device when transmitting the packets, and transmit the network states of the data channels used by the first device when transmitting the packets to the first device. As such, the first device when transmitting packets again may select data channels according to the network states. For example, in a case where the network state of a certain data channel is good, the first device when transmitting packets again may transmit the packets to the multi-channel proxy server only over the data channel with a good network state, thereby reducing the occupation of the data channels and the traffic consumption. In a case where the network states of multiple data channels are poor, the first device when transmitting packets again may transmit the packets to the multi-channel proxy server over the multiple data channels, to ensure the packet transmission stability, thereby avoiding the problems of high packet loss rate and high latency during the data transmission.

In an embodiment of this application, the first device is further configured to determine, based on a reception status of the first packets transmitted to the multi-channel proxy server, network states of the data channels used by the first device when transmitting the packets, and select data channels according to the network states when transmitting the packets. For example, in a case where the network state of a certain data channel is good, the first device may transmit packets to the multi-channel proxy server only over the data channel with a good network state, thereby reducing the occupation of the data channels and the traffic consumption. In a case where the network states of multiple data channels are poor, the first device may transmit packets to the multi-channel proxy server over the multiple data channels, so as to ensure the packet transmission stability, thereby avoiding the problems of high packet loss rate and high latency during the data transmission.

In the following, taking the first device as a dual-channel client, the proxy server as a dual-channel proxy server (namely, taking two data channels for transmitting data as an example), and the second device as an application server for example, the technical solutions of the embodiments of this application are described in detail below.

Figure 5:
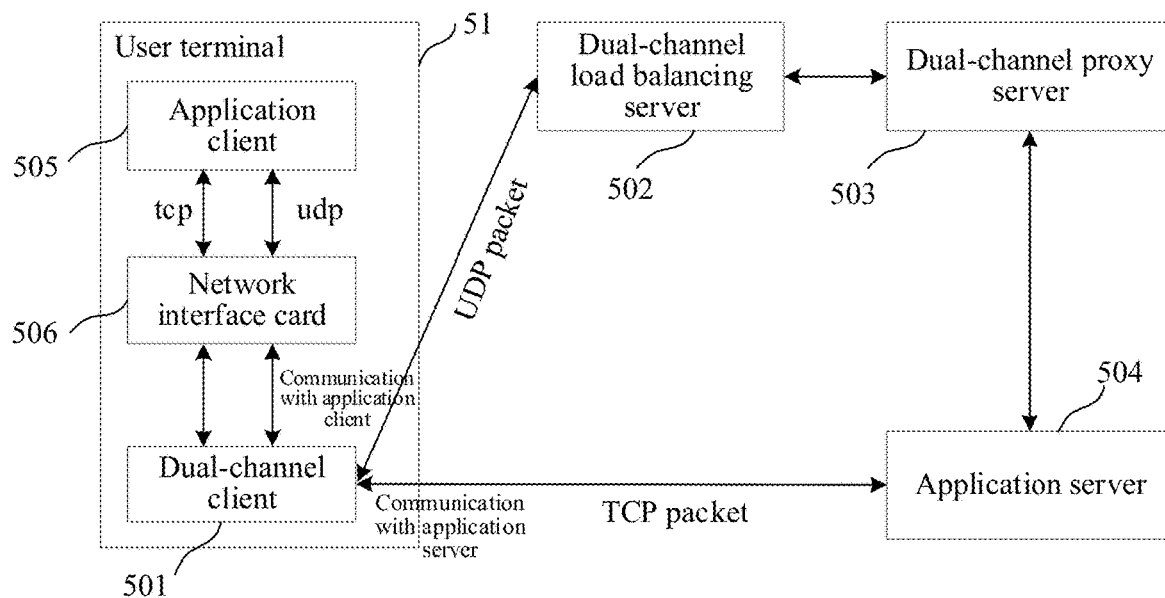
FIG. 5 is a schematic structure diagram of a dual-channel communication system according to an embodiment of this application.

In an embodiment of this application, as shown in FIG. 5, a dual-channel communication system according to an embodiment of this application mainly includes: a user terminal 51, a dual-channel load balancing server 502, a dual-channel proxy server 503, and an application server 504. The user terminal 51 is provided with an application client 505, a network interface card 506, and a dual-channel client 501. The dual-channel client 501 is communicated with the application client 505 through the network interface card.

In an embodiment of this application, the application client 505 and the dual-channel client 501 may transmit TCP packets and UDP packets to each other. After the receiving UDP packets transmitted by the application client 505, the dual-channel client 501 may transmit the UDP packets to the dual-channel load balancing server 502 over dual channels (e.g., a Wi-Fi channel and a 4G channel). Then, the dual-channel load balancing server 502 forwards the UDP packets to the dual-channel proxy server 503. The dual-channel proxy server 503 performs the deduplication processing on the received UDP packets and forwards the UDP packets after the deduplication processing to the application server 504.

In an embodiment of this application, after receiving UDP packets transmitted by the application server 504, the dual-channel proxy server 503 may transmit the UDP packets to the dual-channel load balancing server 502 over the dual channels (such as a Wi-Fi channel and a 4G channel). Then, the dual-channel load balancing server 502 forwards the UDP packets to the dual-channel client 501. The dual-channel client 501 performs the deduplication processing on the received UDP packets and forwards the UDP packets after the deduplication processing to the application client 505 through the network interface card.

In an embodiment of this application, in response to the dual-channel client 501 intercepting a TCP SYN packet (the SYN packet represents a packet for establishing a connection) from the network interface card 506, the dual-channel client 501 immediately establishes a TCP connection with the application server 504 according to destination address information. After establishing the TCP connection, the dual-channel client 501 transmits an ACK+SYN packet (the ACK+SYN packet represents a packet for confirming the establishment of the connection) to the application client 505 through the network interface card 506. Then, a subsequent process for the TCP connection continues. After establishing a TCP virtual connection between the dual-channel client 501 and the game client 505, fd1 (communication with the application client 505) is bridged with fd2 (communication with the application server 504), so as to forward uplink TCP packets transmitted by the application client 505 to the application server 504, and forward downlink TCP packets transmitted by the application server 504 to the application client 505.

Figure 6:
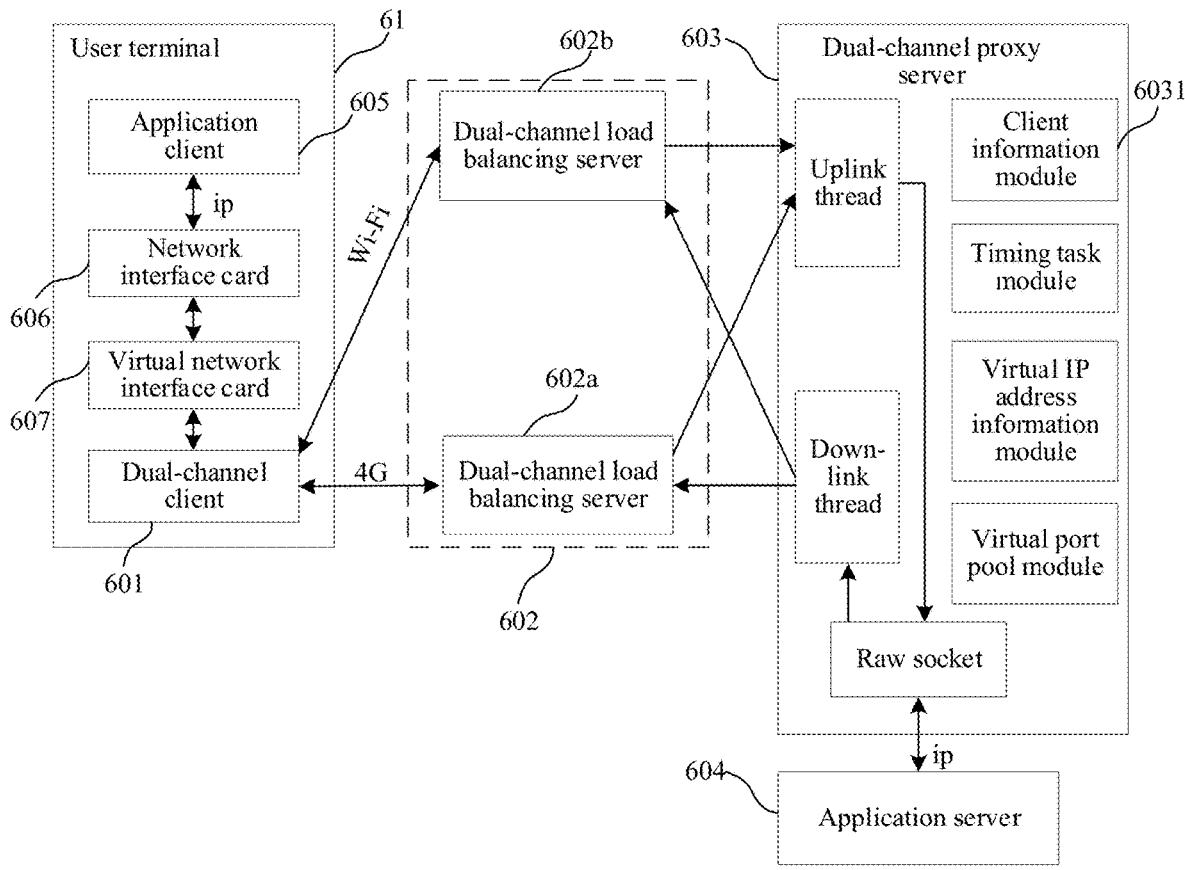
FIG. 6 is a schematic structure diagram of a dual-channel communication system according to an embodiment of this application.

Based on the foregoing problems, in an embodiment of this application, as shown in FIG. 6, a dual-channel communication system according to an embodiment of this application mainly includes: a user terminal 61, a dual-channel load balancing server 602 (a dual-channel load balancing server 602a and a dual-channel load balancing server 602b), a dual-channel proxy server 603, and an application server 604. The user terminal 61 is provided with an application client 605, a network interface card 606, and a dual-channel client 601. It is to be understood that the number of the dual-channel load balancing servers 602 shown in FIG. 6 is merely exemplary. In other embodiments of this application, any number of dual-channel load balancing servers may be set; or no dual-channel load balancing server may be set.

In an embodiment of this application, in response to the dual-channel proxy server 603 receiving a FIN packet of the TCP connection transmitted by a dual-channel client 601, the dual-channel proxy server 603 marks a state of the TCP connection of the dual-channel client 601 as a FIN state, and deletes information of the TCP connection from the client information module 6031 after a timeout period finOutTime (10 seconds by default) has elapsed. The timeout period finOutTime is used for ensuring that four-way wavehand of the TCP connection can be finished normally.

In an embodiment of this application, when the dual-channel proxy server 603 establishes a new TCP connection with a dual-channel client, the dual-channel proxy server 603 determines whether a first TCP packet of the TCP connection is a SYN packet of a three-way handshake. If yes, the dual-channel proxy server 603 establishes the TCP connection and stores connection information in the client information module 6031. If no, the dual-channel proxy server 603 returns a RST packet to the dual-channel client, to terminate the unauthorized TCP connection, thereby ensuring that the dual-channel client can quickly reestablish the TCP connection.

In an embodiment of this application, in response to receiving the SYN packet of the TCP connection transmitted by the application client 605, the dual-channel client 601 may set the TCP mss field, to ensure that packets transmitted by the application server 604 are all within a controllable length range (taking the smaller one of the mss value and the send window size as the TCP packet size), thereby preventing over-large packets from causing buffer overflow and affecting transmission efficiency.

In an embodiment of this application, in response to receiving a SYN+ACK packet of the TCP connection replied from the application server 604, the dual-channel proxy server 603 may set the TCP mss field, to ensure that packets transmitted by the application client are all within a controllable length range, thereby preventing over-large packets from causing buffer overflow and affecting transmission efficiency.

In an embodiment of this application, the dual-channel proxy server 603 can respectively turn off the following options for optimizing the network interface card: Generic Receive Offloading (GRO), TCP Segmentation Offload (TSO), Generic Segmentation Offload (GSO), Large Receive Offload (LRO), to ensure that the TCP mss value setting takes effect.

Figure 7:
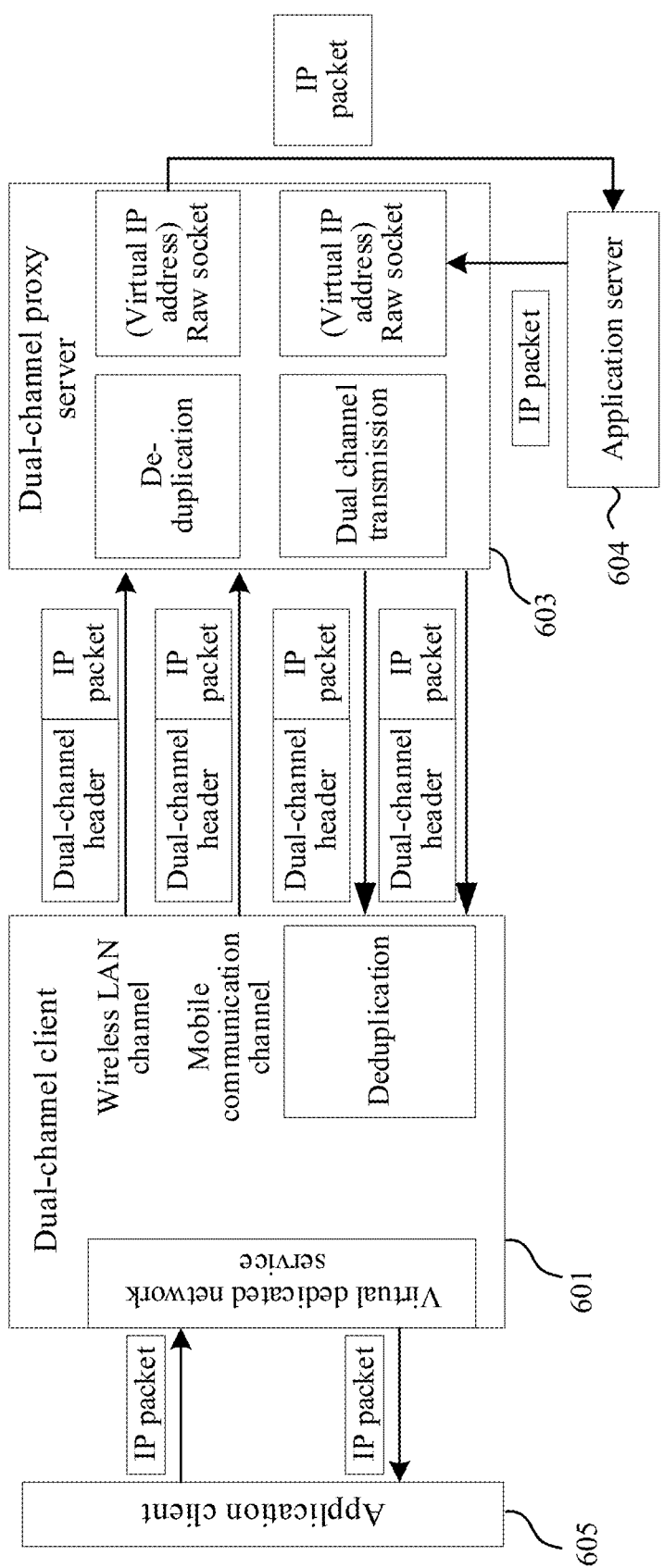
FIG. 7 is a schematic flowchart of a dual-channel communication process according to an embodiment of this application.

As shown in FIG. 6 and FIG. 7, after the dual-channel client 601 is started, a virtual network interface card 607 (the virtual network interface card is communicated with the application client via a physical network interface card in a mobile phone) is created, two threads (i.e., an uplink thread and a downlink thread) are established. At the same time, two UDP socket connections are established and bound to wireless channels, such as a Wi-Fi channel and a 4G mobile communication channel.

In an embodiment of this application, the dual-channel client 601 requests a cloud control server to issue the IP address of the application server 604 based on a corresponding application service configuration. An iptables filtering strategy is set according to the IP address. IP packets transmitted by the application client 605 are intercepted by the network interface card 606 and then forwarded to the virtual network interface card 607.

Figure 8:
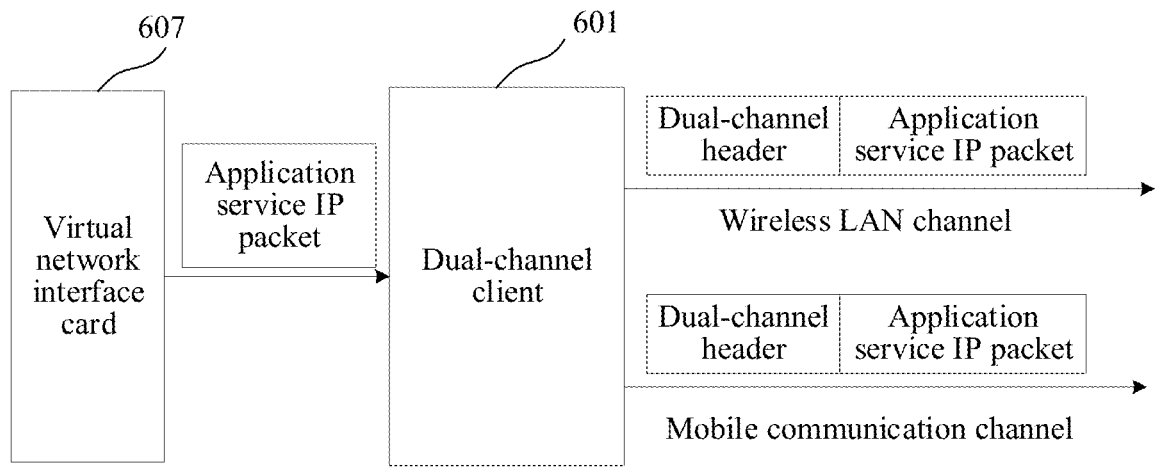
FIG. 8 is a schematic diagram of a dual-channel client adding dual-channel headers to IP packets according to an embodiment of this application.

In an embodiment of this application, as shown in FIG. 8, after the dual-channel client 601 receives the IP packets transmitted by the application client 605 through the virtual network interface card 607, dual-channel headers are added to form dual-channel uplink packets in a format of "dual-channel header+application service IP packet". Based on the UDP protocol, the dual-channel uplink packets are transmitted over wireless local area network channels, for example, a Wi-Fi channel, and a mobile communication channel such as a 4G channel.

In an embodiment of this application, as shown in FIG. 6, when the dual-channel client 601 transmits packets over the dual channels, the dual-channel client 601 may first transmit the packets to the dual-channel load balancing server 602. Then, the dual-channel load balancing server 602 forwards the packets to the uplink thread of the dual-channel proxy server 603. The dual-channel proxy server 603 performs the deduplication processing on the packets and forwards the packets after the deduplication processing to the application server 604.

In an embodiment of this application, as shown in FIG. 7, when the dual-channel client 601 transmits packets over the dual channels, the dual-channel client 601 may directly transmit the packets to the dual-channel proxy server 603. Then, the dual-channel proxy server 603 performs the deduplication processing on the packets and forwards the packets after the deduplication processing to the application server 604.

Figure 9:
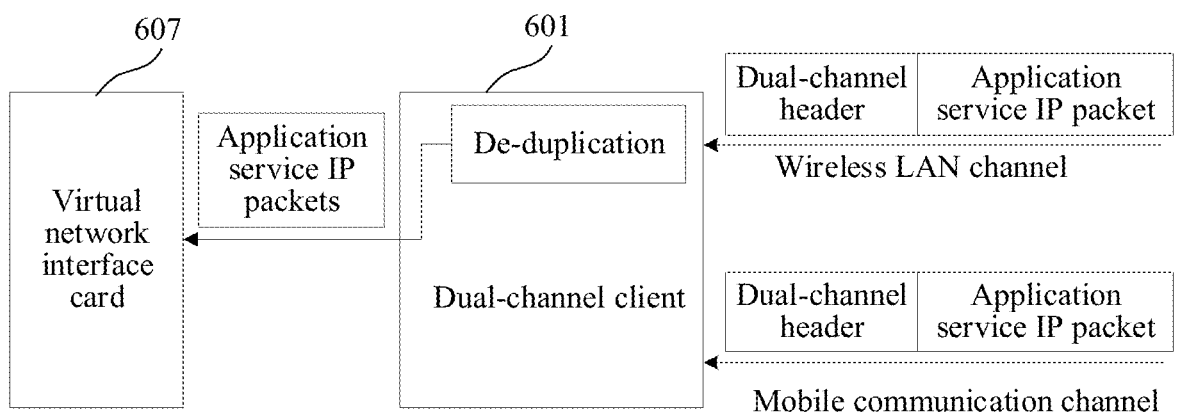
FIG. 9 is a schematic flowchart of a dual-channel client processing received packets according to an embodiment of this application.

In an embodiment of this application, in a case where the application service is a game service, the protocol field of the dual-channel uplink packet transmitted by the dual-channel client 601 may be as follows:

typedef struct MutiTunnelUPHead {
uint32_t m_bussId;//game identifier
uint8_t ver; // filling in identifier of a primary channel
uint8_t type; //type, channel number or packet type of a current uplink packet
uint32_t seqno;//packet sequence number
uint32_t devKey; //unique identifier of a mobile device
uint8_t mutisetID; //operator ID of a primary channel
}MutiTunnelUPHead; //full-stack version protocol code In an embodiment of this application, as shown in FIG. 9, after the dual-channel client 601 receives dual-channel downlink packets in the format of "dual-channel packet header+application service IP packet" transmitted over the dual channels, by performing the deduplication processing on the received dual-channel downlink packets, and removing the headers of the dual-channel downlink packets, the dual-channel client 601 can directly transmit the IP packets stored in the data fields to the virtual network interface card 607, so as to help that the virtual network interface card 607 transmits the application service IP packets to the application client 605 through the network interface card 606, where the application service IP packets may be game IP packets.

In an embodiment of this application, the protocol field of the dual-channel downlink packet received by the dual-channel client 601 may be as follows:

typedef struct {
uint32_t seqno; //packet sequence number
uint32_t devkey; //unique identifier of a client
char data [0]; //package content
}MutiTunnelDownHead In an embodiment of this application, as shown in FIG. 6, the application server 604 transmits the application service IP packets to the downlink thread of the dual-channel proxy server 603, and the dual-channel proxy server 603 adds the dual-channel headers to the application service IP packets, so as to generate the dual-channel downlink packets to be received by the dual-channel client 601. After the dual-channel proxy server 603 generates the dual-channel downlink packets, the dual-channel proxy server 603 transmits the dual-channel downlink packets to the dual-channel load balancing server 602, and the dual-channel load balancing server 602 forwards the dual-channel downlink packets to the dual-channel client 601.

In an embodiment of this application, as shown in FIG. 7, after the dual-channel proxy server 603 generates dual-channel downlink packets, the dual-channel proxy server 603 may directly transmit the dual-channel downlink packets to the dual-channel client 601. Then, the dual-channel client 601 performs the deduplication processing on the dual-channel downlink packets, removes the headers of the dual-channel downlink packets, and directly transmits the IP packets stored in the data fields to the application client 605.

In the following, an interaction between a dual-channel proxy server and an application server according to an embodiment of this application will be described in detail with reference to FIG. 10. The application server may be a game server.

Figure 10:
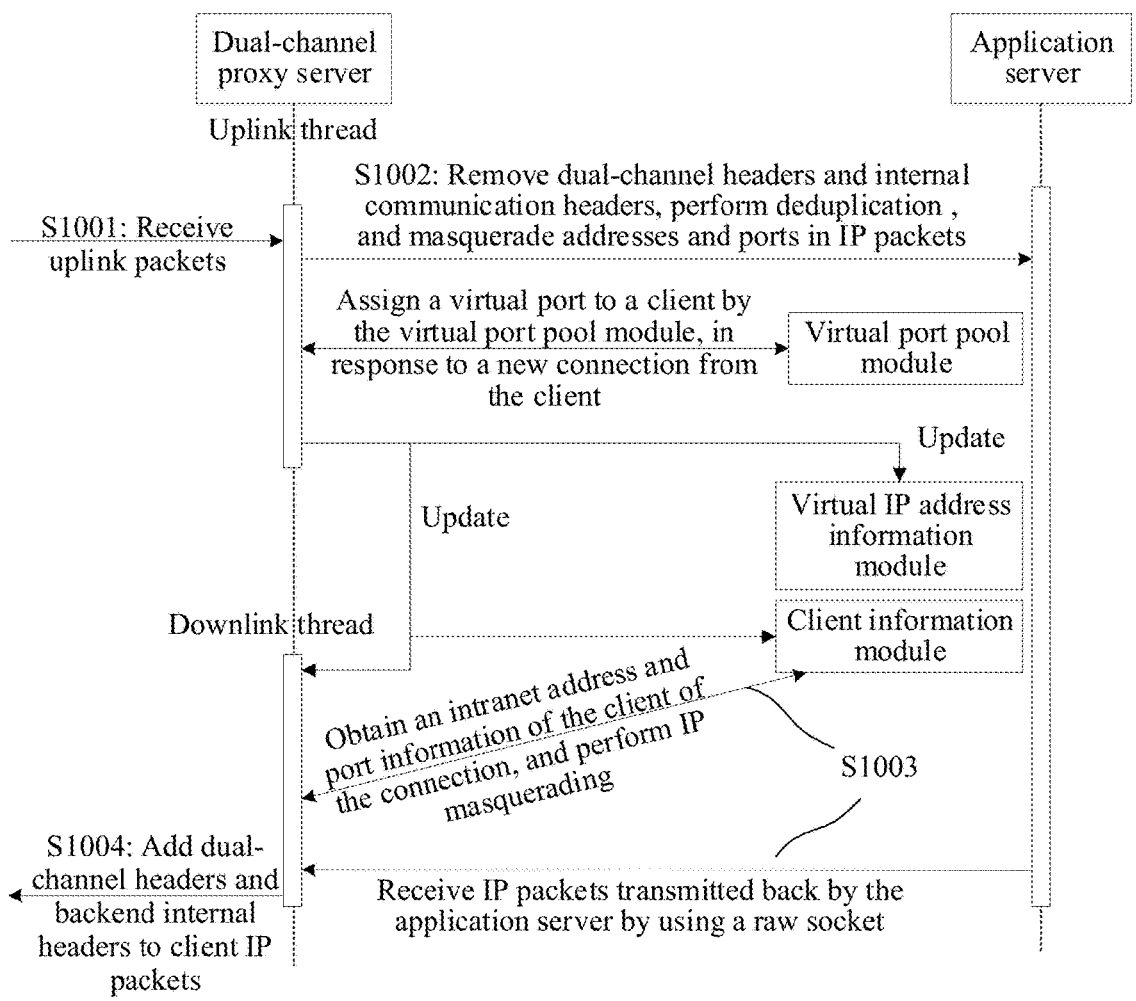
FIG. 10 is a schematic flowchart of an interaction between a dual-channel proxy server and an application server according to an embodiment of this application.

As shown in FIG. 10, the interaction between the dual-channel proxy server and the application server according to an embodiment of this application includes the following steps:

Step S1001. The dual-channel proxy server receives uplink packets transmitted by the dual-channel client over dual channels (directly receives the packets transmitted by the dual-channel client, or indirectly receives the packets through the load balancing server).

Step S1002. The dual-channel proxy server removes received dual-channel headers and internal communication headers, performs the deduplication processing, and transmits IP packets after masquerading addresses and ports in the IP packets to the application server.

In an embodiment of this application, in response to receiving an uplink packet transmitted by the dual-channel client, the dual-channel proxy server records the real address information of the dual-channel client (including an intranet IP and an intranet port) included in the header of the uplink packet into the client information module, and assigns a virtual local port to the dual-channel client by the virtual port pool module. At the same time, the VIP information module is updated according to the address of the application server that the uplink packet needs to access, to add the VIP of the application server that the uplink packet needs to access into the VIP information module.

In an embodiment of this application, according to a client unique identifier included in the headers of the uplink packets, the dual-channel proxy server may identify client IP packets transmitted over the 4G and Wi-Fi channels, and perform the deduplication processing.

In an embodiment of this application, the dual-channel proxy server masquerading the addresses and port information in the IP packets is mainly performed by masquerading the address information in the uplink IP packets after the deduplication processing as the address information of the dual-channel proxy server (including the IP address of the dual-channel proxy server and the virtual port assigned to the dual-channel client), recalculates the checksum fields in the headers of the IP, TCP, or UDP packets, and transmits the packets to the application server by using a raw socket (RawSocket) thread.

Step 1003. The dual-channel proxy server creates a raw-Socket for receiving IP packets by using the downlink thread, filters the IP packets according to the IP information of the application server recorded in the VIP information module and the source addresses (srcAddr) in the IP packets, to obtain IP packets that need to be transmitted to the dual-channel client. The dual-channel proxy server obtains connection information, namely the real address information of the dual-channel client, from the client information module according to the destination port (dstPort) in the IP packets. Then, the dual-channel proxy server masquerades the intranet IP and the intranet port of the dual-channel client in the application service downlink IP packets, and recalculates the checksum fields in the headers of the IP, TCP, or UDP packets.

In an embodiment of this application, the dual-channel client may transmit information of the channels over which the packets are transmitted to the dual-channel proxy server in real time, to assist the proxy server to switch channels, thereby ensuring that the proxy server can update the channel information corresponding to the client at the first time in a case where the 4G channel or the Wi-Fi channel is abnormally switched. The channel information transmitted by the dual-channel client may be maintained in the ver and type fields of the dual-channel protocol header. For example, ver=1 indicates a primary channel, and ver=0 indicates a secondary channel; type=1 indicates 4G communication, and type=0 indicates Wi-Fi communication.

Step S1004. The dual-channel proxy server transmits, based on latest Wi-Fi and 4G channel information transmitted by the dual-channel client, the application service downlink IP packets after adding the dual-channel downlink headers and the dual-channel backend internal protocol headers over the dual channels. The dual-channel proxy server may transmit the processed packets to the dual-channel client based on the UDP protocol.

Figure 11:
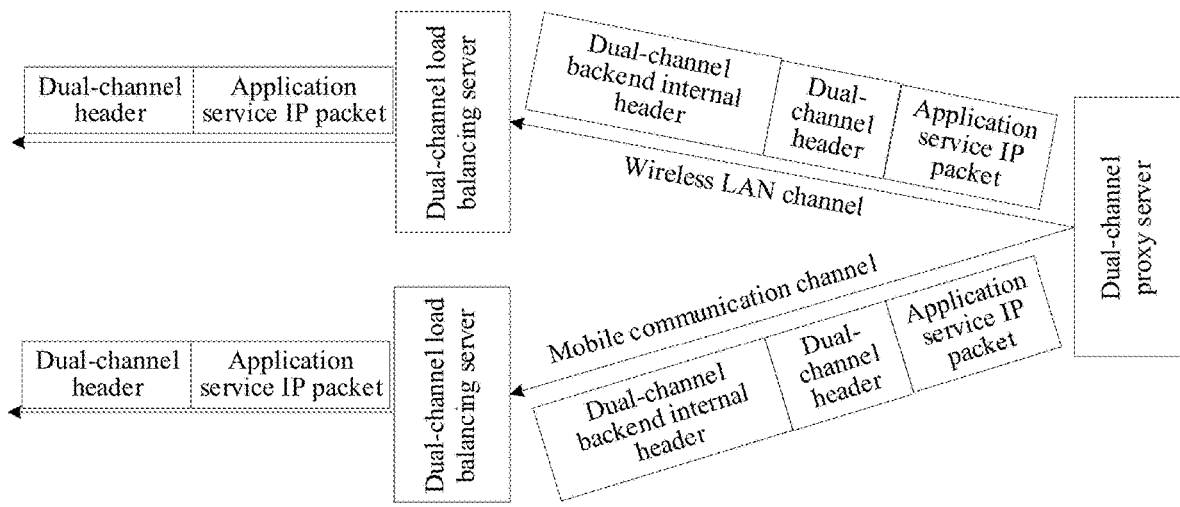
FIG. 11 is a schematic flowchart of an interaction between a dual-channel proxy server and a dual-channel load balancing server according to an embodiment of this application.

In an embodiment of this application, as shown in FIG. 11, the dual-channel proxy server may transmit the application service IP packets after adding the dual-channel downlink headers and the dual-channel backend internal headers to the dual-channel load balancing server. Then, the dual-channel load balancing server transmits the application service IP packets to the dual-channel client after removing the dual-channel backend internal headers.

In an embodiment of this application, the dual-channel proxy server may periodically clean the channel information of the dual-channel client (for example, being triggered by the timing task module shown in FIG. 6). For example, if no dual-channel client data passes through the dual-channel proxy server within the timeout period, the threads and channel information of the dual-channel client are to be cleared.

In the embodiment of this application, the dual-channel proxy server can transparently forward IP packets (the IP packets of the dual-channel client come from the application client) between the dual-channel client and the application server, thus can support the multi-channel data transmission of the full-stack network protocol of the UDP and TCP protocols. This avoids a poor network between the dual-channel client and the application server from causing an untimely TCP connection between the two, which results in a failure in the TCP connection, further resulting in continuous attempts for establishing the TCP connection.

In an embodiment of this application, intelligent low-traffic transmission can be realized by determining the network states of the data channels during the dual-channel transmission. The specific process is as follows:

1. The dual-channel client performs a clock synchronization with the dual-channel proxy server. The specific process is as follows:
   1) The dual-channel client requests the dual-channel proxy server for timestamps of the dual-channel proxy server (for example, requesting 10 times with an interval of 500 ms), records a return delay of the dual-channel proxy server each time, and obtains an average delay avgDelay of the dual-channel client and the dual-channel proxy server by averaging the return delays.

2) The dual-channel client records the timestamp svrTime of the dual-channel proxy server returned by the last request to the dual-channel proxy server and a current time of the dual-channel client localStartTime.

3) The dual-channel client calculates a current server time svrStartTime=svrTime+avgDelay/2.

4) Each packet transmitted by the dual-channel client carries a current server time, i.e., CStime=curTime−localStartTime+svrStartTime; at the same time, each downlink packet transmitted by the dual-channel proxy server carries a current timestamp of the dual-channel proxy server Stime.

2. Assuming data is transmitted over the Wi-Fi and 4G channels, the dual-channel proxy server determines a current jam degree of the Wi-Fi channel based on an uplink packet delay (the current time of the dual-channel proxy server−CStime), to generate a rule for transmitting packets over the 4G channel. For example, in a case where the network state of the Wi-Fi channel is good, the 4G channel may be not used to transmit packets or not used to transmit all the packets, thereby reducing downlink traffic to the user.

In an embodiment of this application, the dual-channel proxy server may also receive a downlink packet delay returned by the dual-channel client, and determine a current jam degree of the Wi-Fi channel, thereby generating a rule for transmitting packets over the 4G channel.

3. The dual-channel client determines a current jam degree of the Wi-Fi channel based on a downlink packet delay (the current time of the dual-channel client-Stime), so as to generate a rule for transmitting packets over the 4G channel. For example, in a case where the network state of the Wi-Fi channel is good, the 4G channel may be not used to transmit packets or not used to transmit all the packets, thereby reducing downlink traffic to the user.

In an embodiment of this application, the dual-channel client may also receive an uplink packet delay returned by the dual-channel proxy server, and determine a current jam degree of the Wi-Fi channel, thereby generating a rule for transmitting packets over the 4G channel.

Figure 12:
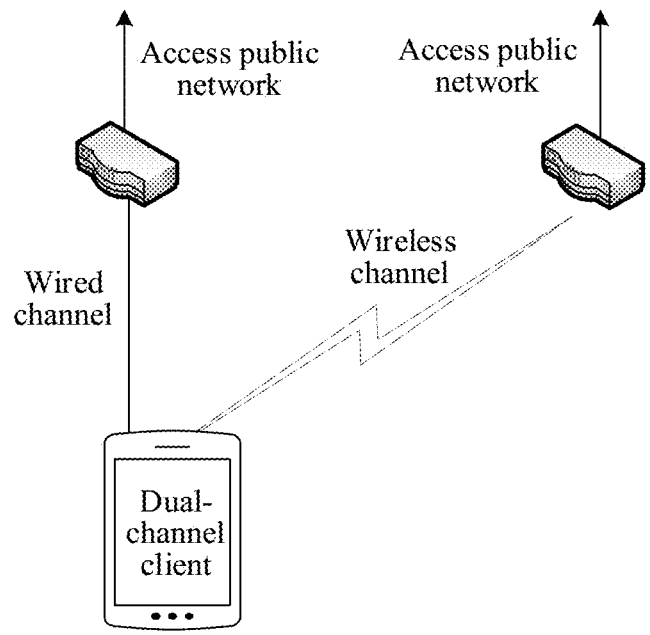
FIG. 12 is a schematic diagram of a dual-channel system including a wireless local area network channel and a wired channel according to an embodiment of this application.
Figure 13:
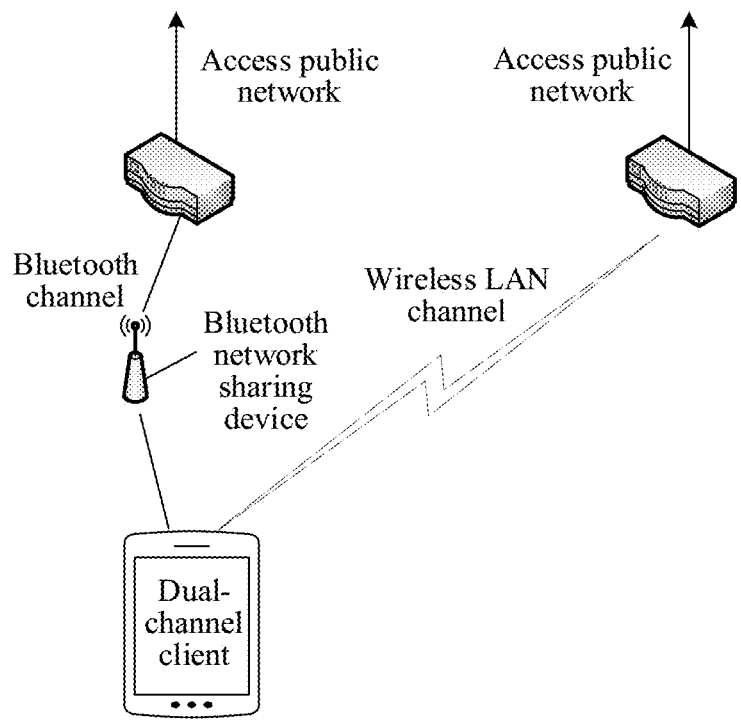
FIG. 13 is a schematic diagram of a dual-channel system including a wireless local area network channel and a Bluetooth channel according to an embodiment of this application.

The technical solutions of the above-mentioned embodiments of this application take the Wi-Fi channel and the 4G channel as examples to illustrate the dual-channel data transmission in detail. In other embodiments of this application, as shown in FIG. 12, the dual channels are a wireless channel and a wired channel, where the wireless channel is a Wi-Fi channel, and the wired channel is connected to a network through an On-The-Go (OTG) cable to a network cable; alternatively as shown in FIG. 13, the dual channels are a wireless channel and a Bluetooth channel, where the wireless channel is a Wi-Fi channel, and the Bluetooth channel is connected to a network via a Bluetooth network sharing device. The Bluetooth network sharing device may be a dedicated sharing device, or a mobile phone Bluetooth network hot spot, or a computer hot spot. It is to be understood that the dual channels are, for example, a wired channel and a Bluetooth channel, or a wired channel and a 4G channel, or a Bluetooth channel and a 4G channel.

Besides, in other embodiments of this application, three or more data channels may be used for transmitting data. Such data channels may include a Wi-Fi channel, a Bluetooth channel, a wired channel, and a mobile communication network (such as 3G/4G/5G, etc.) channel.

The multi-channel data transmission solution according to the embodiment of this application is flexible, for the reason that it allows most services to access at zero cost without any changes and adaptations of the services, and supports almost all types of services and applications, such as game services. Besides, users may not be aware of a network failure occurring in a certain data channel. It can effectively prevent more than 70% of clients from network jamming, which is more effective in a Wi-Fi network that offers a complex environment. Also, it can avoid most Wi-Fi interference in a case of a competition network, thereby solving problems related to the TCP connection and the dual-channel acceleration.

The following describes apparatus embodiments of this application, which can be used to implement the data transmission method in the foregoing embodiments of this application. For details undisclosed in the apparatus embodiments of this application, refer to the embodiments of the foregoing data transmission method in this application.

Figure 14:
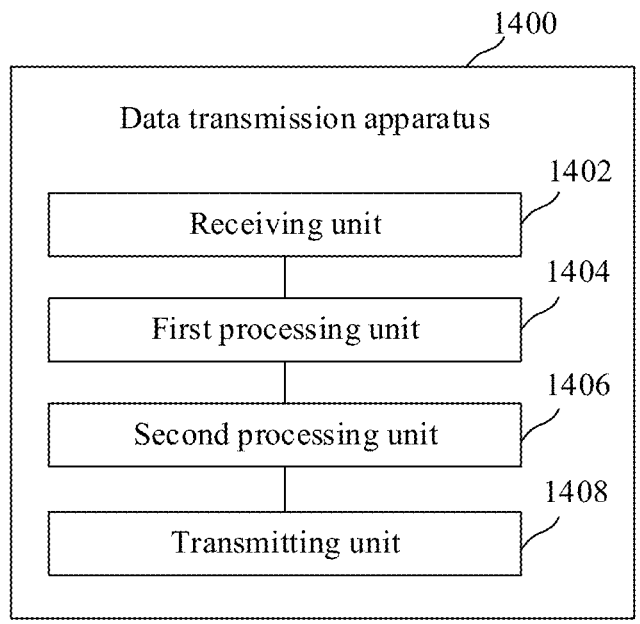
FIG. 14 is a schematic block diagram of a data transmission apparatus according to an embodiment of this application.

FIG. 14 is a schematic block diagram of a data transmission apparatus according to an embodiment of this application.

Referring to FIG. 14, a data transmission apparatus 1400 according to an embodiment of this application includes: a receiving unit 1402, a first processing unit 1404, a second processing unit 1406, and a transmitting unit 1408.

The receiving unit 1402 is configured to receive first packets transmitted by a first device over multiple data channels. The first processing unit 1404 is configured to parse the first packets to obtain address information of the first device, and perform aggregation on the first packets according to headers of the first packets, to obtain second packets. The second processing unit 1406 is configured to replace source address information of the second packets with designated address information, to obtain third packets. The transmitting unit 1408 is configured to transmit the third packets to a second device, the second device being a device that the first device needs to access.

In an embodiment of this application, the data transmission apparatus 1400 further includes: a first determining unit, configured to determine fourth packets that need to be transmitted to the first device from packets transmitted by the second device. The second processing unit 1406 is further configured to replace destination address information of the fourth packets with the address information of the first device, to obtain fifth packets. The transmitting unit 1408 is further configured to transmit the fifth packets to the first device.

In an embodiment of this application, the data transmission apparatus 1400 further includes: a first storing unit. The first processing unit 1404 is further configured to parse the first packets to obtain address information that the first device needs to access, and determine the second device according to the address information that the first device needs to access. The first storing unit is configured to store the address information that the first device needs to access.

In an embodiment of this application, the first determining unit is configured to: determine source address information of the packets transmitted by the second device, obtain, according to the address information that the first device needs to access, packets whose source address information matches the address information that the first device needs to access from the packets transmitted by the second device, and use the obtained packets as the fourth packets.

In an embodiment of this application, the data transmission apparatus 1400 further includes: an assigning unit, configured to assign a virtual port to the first device; and a second storing unit, configured to store the address information of the first device in association with the virtual port assigned to the first device, where the designated address information includes the virtual port assigned to the first device.

In an embodiment of this application, the second processing unit 1406 is further configured to, obtain stored address information of the first device according to the virtual port included in the destination address information of the fourth packets, before replacing destination address information of the fourth packets with the address information of the first device.

In an embodiment of this application, the receiving unit 1402 is further configured to receive and store data channel information for transmitting the first packets that is transmitted by the first device. The transmitting unit 1408 is configured to: transmit the fifth packets to the first device according to latest stored data channel information.

In an embodiment of this application, the data transmission apparatus 1400 further includes: a second determining unit, configured to determine, based on a reception status of the first packets transmitted by the first device, network states of the data channels used by the first device when transmitting the packets. The transmitting unit 1408 is configured to: select one or more data channels to transmit the fifth packets to the first device, according to the network states of the data channels used by the first device when transmitting the packets.

In an embodiment of this application, the second determining unit is configured to: calculate a delay of the packets transmitted by the first device according to a first moment at which the packets transmitted by the first device are received and a second moment included in the packets transmitted by the first device, where the second moment is determined based on a moment at which the first device transmits the packets and a clock synchronization compensation value between the server and the first device; and determine the network states of the data channels used by the first device when transmitting the packets, according to the delay of the packets transmitted by the first device.

In an embodiment of this application, the data transmission apparatus 1400 further includes: a third determining unit, configured to receive a reception status of the fifth packets transmitted to the first device that is returned by the first device, to determine network states of data channels used by the first device when receiving the packets. The transmitting unit 1408 is configured to: select one or more data channels to transmit the fifth packets to the first device according to the network states of the data channels used by the first device when receiving the packet.

In an embodiment of this application, the data transmission apparatus 1400 further includes: a fourth determining unit, configured to determine, based on a reception status of the first packets transmitted by the first device, network states of the data channels used by the first device when transmitting the packets. The transmitting unit 1408 is configured to transmit the network states of the data channels used by the first device when transmitting the packets to the first device, so that the first device when transmitting packets again can select data channels according to the network states.

In an embodiment of this application, the data transmission apparatus 1400 further includes: a third processing unit, configured to delete stored information related to the first device after a predetermined period of time has elapsed, in response to receiving a packet for disconnecting a TCP connection transmitted by the first device; and/or in a case of establishing a TCP connection with the first device, transmit a packet for resetting the connection to the first device, if a first TCP packet received from the first device is not a packet for establishing the TCP connection; and/or set a maximum segment size of packets transmitted by the second device.

Figure 15:
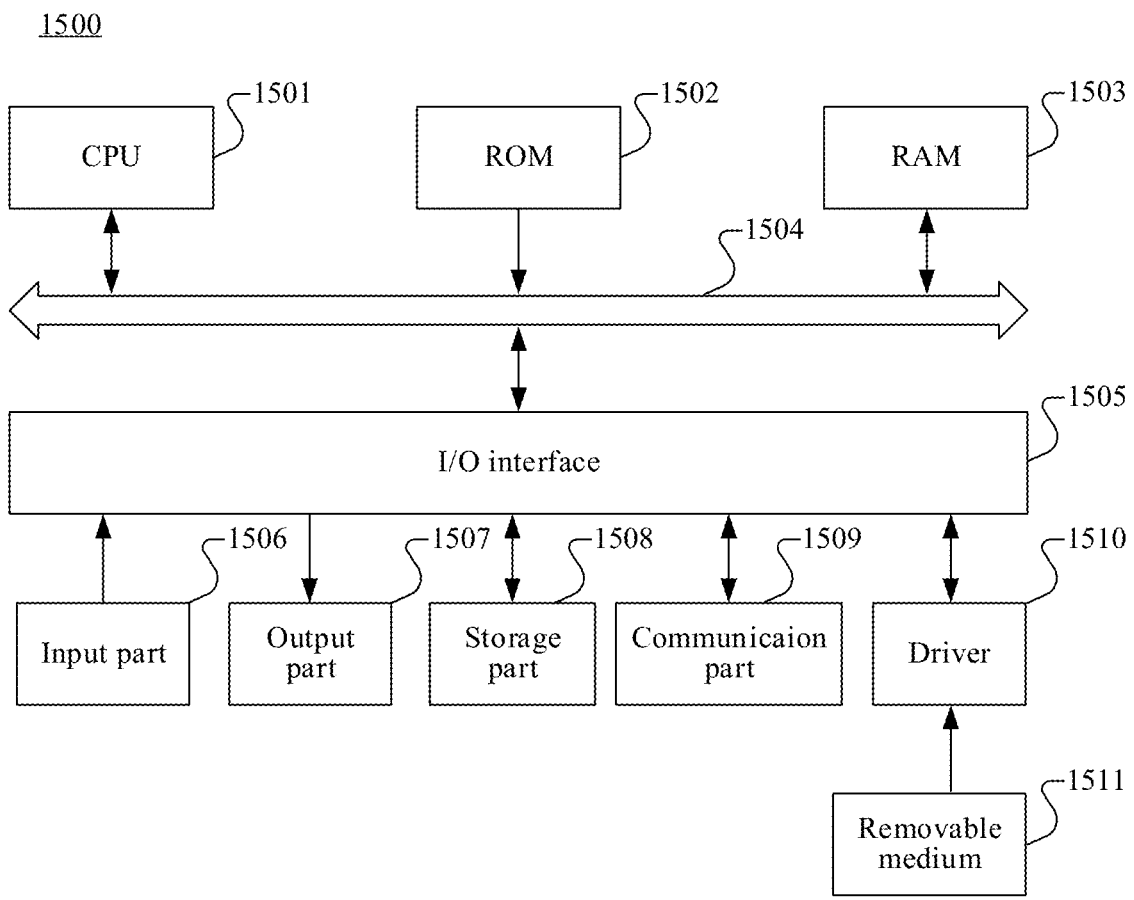
FIG. 15 is a schematic structural diagram of a computer system adapted to implement an electronic device according to an embodiment of this application.

FIG. 15 is a schematic structural diagram of a computer system adapted to implement an electronic device according to an embodiment of this application.

A computer system 1500 of the electronic device shown in FIG. 15 is merely an example, and does not constitute any limitation on functions and use ranges of the embodiments of this application.

As shown in FIG. 15, the computer system 1500 includes a central processing unit (CPU) 1501, which may perform various proper actions and processing based on a program stored in a read-only memory (ROM) 1502 or a program loaded from a storage part 1508 into a random access memory (RAM) 1503, for example, perform the method in the foregoing embodiments. The RAM 1503 further stores various programs and data required for operating the system. The CPU 1501, the ROM 1502, and the RAM 1503 are connected to each other through a bus 1504. An input/output (I/O) interface 1505 is also connected to the bus 1504.

The following components are connected to the I/O interface 1505: an input part 1506 including a keyboard, a mouse, or the like, an output part 1507 including a cathode ray tube (CRT), a liquid crystal display (LCD), a speaker, or the like, a storage part 1508 including a hard disk, or the like, and a communication part 1509 including a network interface card such as a local area network (LAN) card or a modem. The communication part 1509 performs communication processing by using a network such as the Internet. A driver 1510 is also connected to the I/O interface 1505 as required. A removable medium 1511, such as a magnetic disk, an optical disc, a magneto-optical disk, or a semiconductor memory, is installed on the drive 1510 as required, so that a computer program read from the removable medium is installed into the storage part 1508 as required.

Particularly, according to an embodiment of this application, the processes described in the following by referring to the flowcharts may be implemented as computer software programs. For example, this embodiment of this application includes a computer program product, the computer program product includes a computer program carried on a computer-readable medium, and the computer program includes program code used for performing the methods shown in the flowcharts. In such an embodiment, by using the communication part 1509, the computer program may be downloaded and installed from a network, and/or installed from the removable medium 1511. When the computer program is executed by the CPU 1501, the various functions defined in the system of this application are executed.

The computer-readable medium shown in the embodiments of this application may be a computer-readable signal medium or a computer-readable storage medium or any combination the two. The computer-readable storage medium may be, for example, but is not limited to, an electric, magnetic, optical, electromagnetic, infrared, or semi-conductive system, apparatus, or component, or any combination of the above. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In this application, the computer-readable storage medium may be any tangible medium containing or storing a program, and the program may be used by or used in combination with an instruction execution system, an apparatus, or a device. In this application, a computer-readable signal medium may include a data signal being in a baseband or propagated as a part of a carrier wave, the data signal carrying computer-readable program code. Such a propagated data signal may be in a plurality of forms, including but not limited to an electromagnetic signal, an optical signal, or any suitable combination thereof. The computer-readable signal medium may be further any computer readable medium in addition to a computer-readable storage medium. The computer readable medium may send, propagate, or transmit a program that is used by or used in conjunction with an instruction execution system, an apparatus, or a device. The program code included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions and operations that may be implemented by a system, a method, and a computer program product according to various embodiments of this application. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. It is also to be understood that, each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of this application may be implemented in a software manner, or may be implemented in a hardware manner, and the unit described can also be set in a processor. Names of the units do not constitute a limitation on the units in a specific case.

According to another aspect, this application further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of this application, the features and functions of two or more modules or units described above may be specifically implemented in one module or unit. Conversely, features and functions of one module or unit described above may be further divided into a plurality of modules or units for implementation.

Through the descriptions of the foregoing implementations, a person skilled in the art easily understands that the exemplary implementations described herein may be implemented through software, or may be implemented through software located in combination with necessary hardware. Therefore, the technical solutions of the embodiments of this application may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this application.

After considering the specification and practicing this application, a person skilled in the art may easily conceive of other implementations of this application. This application is intended to cover any variations, uses or adaptive changes of this application following the general principles of this application, and includes the well-known knowledge and conventional technical means in the art and undisclosed in this application.

It is to be understood that this application is not limited to the precise structures described above and shown in the accompanying drawings, and various modifications and changes may be made without departing from the scope of this application. The scope of this application is subject only to the appended claims.

What is claimed is:

1. A data transmission method performed by a computing device, comprising:
   receiving first packets and data channel information for transmitting the first packets transmitted by a first device over multiple data channels, wherein the data channel information includes a primary channel identifier and a type of the primary channel and the primary channel is one of a 4G channel and a Wi-Fi channel;
   parsing the first packets to obtain address information of the first device, storing the address information that the first device needs to access, and performing aggregation on the first packets according to headers of the first packets, to obtain second packets;
   replacing source address information of the second packets with designated address information, to obtain third packets, wherein the designated address information comprises a virtual port assigned to the first device and associated with the address information of the first device;
   transmitting the third packets to a second device, the second device being a device that the first device needs to access;
   determining fourth packets that need to be transmitted to the first device from packets transmitted by the second device;
   replacing destination address information of the fourth packets with the address information of the first device, to obtain fifth packets;
   updating the primary channel identifier and the type of the primary channel in the data channel information in accordance with a switch between the 4G channel and the Wi-Fi channel; and
   transmitting the fifth packets to the first device over one or more of the multiple data channels according to the updated data channel information.

2. The data transmission method according to claim 1, wherein the determining, according to the stored address information that the first device needs to access, fourth packets that need to be transmitted to the first device from packets transmitted by the second device comprises:
 determining source address information of the packets transmitted by the second device; and
 obtaining, according to the stored address information that the first device needs to access, packets whose source address information matches the address information that the first device needs to access from the packets transmitted by the second device, and using the obtained packets as the fourth packets that need to be transmitted to the first device.

3. The data transmission method according to claim 1, wherein when receiving a packet transmitted by the first device for the first time, the virtual port is assigned to the first device and the address information of the first device is stored in association with the virtual port assigned to the first device.

4. The data transmission method according to claim 3, further comprising:
 before replacing destination address information of the fourth packets with the address information of the first device obtaining stored address information of the first device according to the information about the virtual port comprised in the destination address information of the fourth packets.

5. The data transmission method according to claim 1, further comprising:
 storing the data channel information for transmitting the first packets that is transmitted by the first device; and
 transmitting the fifth packets to the first device, according to the stored data channel information.

6. The data transmission method according to claim 1, further comprising:
 determining, based on a reception status of the first packets transmitted by the first device, network states of the multiple data channels used by the first device for transmitting the first packets; and
 selecting one or more data channels to transmit the fifth packets to the first device, according to the network states of the data channels used by the first device during transmitting the first packets.

7. The data transmission method according to claim 6, wherein the determining, based on a reception status of the first packets transmitted by the first device, network states of the data channels used by the first device during transmitting the first packets comprises:
 calculating a delay of the first packets transmitted by the first device, according to a first moment at which the first packets transmitted by the first device are received and a second moment comprised in the first packets transmitted by the first device, wherein the second moment is determined based on a moment at which the first device transmits the first packets and a clock synchronization compensation value between the server and the first device; and
 determining the network states of the data channels used by the first device during transmitting the first packets, according to the delay of the first packets transmitted by the first device.

8. The data transmission method according to claim 1, further comprising:
 determining, based on a reception status of the first packets transmitted by the first device, network states of the data channels used by the first device during transmitting the first packets; and
 transmitting the network states of the data channels used by the first device during transmitting the first packets to the first device, to enable the first device to select data channels according to the network states in case of transmitting packets again.

9. The data transmission method according to claim 1, further comprising:
 deleting stored information related to the first device after a predetermined period of time has elapsed, in response to receiving a packet for disconnecting a Transmission Control Protocol (TCP) connection transmitted by the first device.

10. A computing device, comprising:
 one or more processors; and
 memory coupled to the one or more processors, configured to store one or more programs that, when executed by the one or more processors, cause the computing device to perform a plurality of operations including:
 receiving first packets and data channel information for transmitting the first packets transmitted by a first device over multiple data channels, wherein the data channel information includes a primary channel identifier and a type of the primary channel and the primary channel is one of a 4G channel and a Wi-Fi channel;
 parsing the first packets to obtain address information of the first device, storing the address information that the first device needs to access, and performing aggregation on the first packets according to headers of the first packets, to obtain second packets;
 replacing source address information of the second packets with designated address information, to obtain third packets, wherein the designated address information comprises a virtual port assigned to the first device and associated with the address information of the first device;
 transmitting the third packets to a second device, the second device being a device that the first device needs to access;
 determining fourth packets that need to be transmitted to the first device from packets transmitted by the second device;
 replacing destination address information of the fourth packets with the address information of the first device, to obtain fifth packets;
 updating the primary channel identifier and the type of the primary channel in the data channel information in accordance with a switch between the 4G channel and the Wi-Fi channel; and
 transmitting the fifth packets to the first device over one or more of the multiple data channels according to the updated data channel information.

11. The computing device according to claim 10, wherein the plurality of operations further comprise:
 determining, based on a reception status of the first packets transmitted by the first device, network states of the data channels used by the first device during transmitting the first packets; and
 transmitting the network states of the data channels used by the first device during transmitting the first packets to the first device, to enable the first device to select data channels according to the network states in case of transmitting packets again.

12. The computing device according to claim 10, wherein the plurality of operations further comprise:

deleting stored information related to the first device after a predetermined period of time has elapsed, in response to receiving a packet for disconnecting a Transmission Control Protocol (TCP) connection transmitted by the first device.

13. The computing device according to claim 10, wherein the determining, according to the stored address information that the first device needs to access, fourth packets that need to be transmitted to the first device from packets transmitted by the second device comprises:
   determining source address information of the packets transmitted by the second device; and
   obtaining, according to the stored address information that the first device needs to access, packets whose source address information matches the address information that the first device needs to access from the packets transmitted by the second device, and using the obtained packets as the fourth packets that need to be transmitted to the first device.

14. The computing device according to claim 10, wherein when receiving a packet transmitted by the first device for the first time, the virtual port is assigned to the first device and the address information of the first device is stored in association with the virtual port assigned to the first device.

15. The computing device according to claim 10, wherein the plurality of operations further comprise:
   storing the data channel information for transmitting the first packets that is transmitted by the first device; and
   transmitting the fifth packets to the first device, according to the stored data channel information.

16. A non-transitory computer-readable storage medium, storing a plurality of computer programs, the computer programs, when executed by a processor of a computing device, cause the computing device to perform a plurality of operations including:
   receiving first packets and data channel information for transmitting the first packets transmitted by a first device over multiple data channels, wherein the data channel information includes a primary channel identifier and a type of the primary channel and the primary channel is one of a 4G channel and a Wi-Fi channel;
   parsing the first packets to obtain address information of the first device, storing the address information that the first device needs to access, and performing aggregation on the first packets according to headers of the first packets, to obtain second packets;
   replacing source address information of the second packets with designated address information, to obtain third packets, wherein the designated address information comprises a virtual port assigned to the first device and associated with the address information of the first device;
   transmitting the third packets to a second device, the second device being a device that the first device needs to access;
   determining fourth packets that need to be transmitted to the first device from packets transmitted by the second device;
   replacing destination address information of the fourth packets with the address information of the first device, to obtain fifth packets;
   updating the primary channel identifier and the type of the primary channel in the data channel information in accordance with a switch between the 4G channel and the Wi-Fi channel; and
   transmitting the fifth packets to the first device over one or more of the multiple data channels according to the updated data channel information.

17. The non-transitory computer-readable storage medium according to claim 16, wherein the plurality of operations further comprise:
   determining, based on a reception status of the first packets transmitted by the first device, network states of the data channels used by the first device during transmitting the first packets; and
   transmitting the network states of the data channels used by the first device during transmitting the first packets to the first device, to enable the first device to select data channels according to the network states in case of transmitting packets again.

18. The non-transitory computer-readable storage medium according to claim 16, wherein the determining, according to the stored address information that the first device needs to access, fourth packets that need to be transmitted to the first device from packets transmitted by the second device comprises:
   determining source address information of the packets transmitted by the second device; and
   obtaining, according to the stored address information that the first device needs to access, packets whose source address information matches the address information that the first device needs to access from the packets transmitted by the second device, and using the obtained packets as the fourth packets that need to be transmitted to the first device.

19. The non-transitory computer-readable storage medium according to claim 16, wherein when receiving a packet transmitted by the first device for the first time, the virtual port is assigned to the first device and the address information of the first device is stored in association with the virtual port assigned to the first device.

20. The non-transitory computer-readable storage medium according to claim 16, wherein the plurality of operations further comprise:
   storing the data channel information for transmitting the first packets that is transmitted by the first device; and
   transmitting the fifth packets to the first device, according to the stored data channel information.

* * * * *